US008615786B1

(12) United States Patent
Bryce et al.

(10) Patent No.: US 8,615,786 B1
(45) Date of Patent: Dec. 24, 2013

(54) SYSTEM AND METHOD FOR ENHANCING, SECURING, CONTROLLING AND CUSTOMIZING EMPLOYEE NETWORK APPLICATIONS AND USAGE

(75) Inventors: Daniel John Bryce, Altadena, CA (US); Todd Christopher Williams, Thousand Oaks, CA (US)

(73) Assignee: Answer Financial Inc., Encino, CA (US)

( * ) Notice: Subject to any disclaimer, the term of this patent is extended or adjusted under 35 U.S.C. 154(b) by 1333 days.

(21) Appl. No.: 11/939,443

(22) Filed: Nov. 13, 2007

Related U.S. Application Data (60) Provisional application No. 60/858,670, filed on Nov. 13, 2006.

(51) Int. Cl.
*G06F 7/04* (2006.01)
(52) U.S. Cl.
USPC ................................. 726/2; 726/4; 726/17
(58) Field of Classification Search
USPC ............................................................ 726/2
See application file for complete search history.

(56) References Cited

U.S. PATENT DOCUMENTS

| | | | |
|---|---|---|---|
| 6,473,794 B1 | 10/2002 | Guheen et al. | |
| 6,721,713 B1 | 4/2004 | Guheen et al. | |
| 6,742,015 B1 | 5/2004 | Bowman-Amuah | |
| 6,789,189 B2 | 9/2004 | Wheeler et al. | |
| 2002/0055351 A1 | 5/2002 | Elsey et al. | |
| 2005/0172229 A1* | 8/2005 | Reno et al. | 715/700 |
| 2006/0095568 A1 | 5/2006 | Makagon et al. | |
| 2006/0178918 A1 | 8/2006 | Mikurak | |
| 2007/0038610 A1 | 2/2007 | Omoigui | |

OTHER PUBLICATIONS

Browser Helper Objects: The Browser the Way You Want It, Dino Esposito, Microsoft, 1999.*
Scott Spenbaue, PC World, Internet Tips: Play It Safe With the Right Browser Security Settings, Jul. 29, 2003.*
http://www.ibm.com/developerworks/web/library/wa-singlesign/, Sep. 30, 2003.*
http://www.velocityreviews.com/forums/t347610-keylogger-in-python.html, Jul. 30, 2005.*
http://blogs.technet.com/b/heyscriptingguy/archive/2005/02/14 printed out in Oct. 2, 2011.*
http://blogs.technet.com/b/heyscriptingguy/archive/2005/05/02 printed out in Oct. 2, 2011.*

* cited by examiner

*Primary Examiner* — David Y Jung
(74) *Attorney, Agent, or Firm* — Pillsbury Winthrop Shaw Pittman LLP (57) ABSTRACT

The invention relates to various solutions to the challenges of supporting call centers and networks having a plurality of network connected agents or employees. According to one aspect, the invention manages agent authentication, including hiding the authentication methods (e.g., username and password) from the agent. According to another aspect, the invention provides information bridging, such as entering previously-collected information in carrier site pages. According to yet another aspect, the invention provides scripting, such as performing agency-specific scripting and guidance. According to still another aspect, the invention restricts agents from visiting non-approved sites. According to yet another aspect, the invention monitors and logs data fields of particular interest.

22 Claims, 4 Drawing Sheets

SYSTEM AND METHOD FOR ENHANCING, SECURING, CONTROLLING AND CUSTOMIZING EMPLOYEE NETWORK APPLICATIONS AND USAGE

CROSS-REFERENCE TO RELATED APPLICATIONS

The present application is based on, and claims priority from, U.S. Provisional Appln. No. 60/858,670, filed Nov. 13, 2006, the contents of which are incorporated by reference herein in their entirety.

FIELD OF THE INVENTION

The present invention relates to managing computer applications for a plurality of connected users, and more particularly to controlling third party and internal system access and authentication and providing customized data entry for employees accessing applications via a computer network.

BACKGROUND OF THE INVENTION

In the past, workers relied on relatively few applications running on a desktop computer. These applications tended to grow increasingly large and complex in response to the ever-increasing competition to provide additional functionality. Application vendors strived to become the common interface under which users could perform a broad range of tasks. With the success of the Internet, that trend began to reverse and today one tends to rely on many more independent or loosely coupled applications. In many cases these applications are provided by multiple vendors and hosted across multiple servers.

Managing passwords is a big problem for organizations. According to the research analysis firm Gartner, 40 percent of all help desk calls are for forgotten or expired passwords. That results in a high administrative cost to the help desk and, more importantly, a substantial amount of user downtime and lost productivity when people are locked out of their systems. It is even possible for a single agent entering a wrong password to lock out an entire call center for a specific partner website that uses an agency (not agent-specific) authentication approach.

Some prior art approaches to solving this problem include requiring multiple accounts and complex passwords; however, experts note that some agents invariably write their passwords on sticky notes and place them on the bottom of their keyboards or elsewhere near their computers. Other attempts to solve the password problems employ HTTP command-line scripting tools such as wget, cURL, lynx and expect. While these enjoyed limited success for some websites, it was clear that an approach was needed that could provide far more capabilities.

Another problem common in agent applications is that entering data elements multiple times becomes tedious. Prior art helper applications such as BonziBUDDY and Gator aimed at solving this problem by remembering data fields and automatically populating forms for the consumer. Unfortunately, most of these applications soon became classified as malware, as they carried out other functions (such as sending back data to a reporting server) that the consumer may not have realized when installing the application. More recently, several browsers such as Internet Explorer have begun to offer some form-filling operations. However, these browser applications are limited in that they only collect data that the user entered once, and then they pre-fill it when they find a field with exactly the same name.

Yet another problem in agent applications is that employees sometimes misuse their free access to the Internet. Internet filtering and web security solutions such as NetNanny and WebSense provide some capabilities to selectively allow access to known safe sites or to limit the time agents are allowed to spend on various categories of sites. However, it may also be desirable to modify the site content before rendering it in the user's browser, and to either strip or log the data submitted from a user's browser before passing it along to a web site. These prior art approaches do not provide such abilities.

Other related prior art approaches and technologies are disclosed in U.S. Patent Pub. No. 2006178918, U.S. Pat. No. 6,742,015, U.S. Pat. No. 6,721,713, U.S. Pat. No. 6,473,794, U.S. Patent Pub. No. 20070038610, U.S. Pat. No. 6,789,189, U.S. Patent Pub. No. 20020055351, U.S. Patent Pub. No. 20060095568. However, none of these references satisfactorily addresses the problems noted above among others.

SUMMARY OF THE INVENTION

The invention relates to various solutions to the challenges of supporting call centers and networks having a plurality of network connected agents or employees. According to one aspect, the invention manages agent authentication, including hiding the authentication methods (e.g., username and password) from the agent. According to another aspect, the invention provides information bridging, such as entering previously-collected information in carrier site pages. According to yet another aspect, the invention provides scripting, such as performing agency-specific scripting and guidance. According to still another aspect, the invention restricts agents from visiting non-approved sites. According to yet another aspect, the invention monitors and logs data fields of particular interest.

A system and process according to the invention thereby provides many novel features that can be applied in support of a company network and/or call center environment. For example, an agent may use the invention to securely log in to a remote carrier website without knowing the username or password, thereby eliminating the vast majority of security concerns related to password sharing, personal password management and outsider access to customer data. The invention can improve the usability of external web sites for the agent in a number of ways, including the displaying of helpful tips on filling fields, automatic redirection around problem sites, and the removal of non-essential data or features. Many other advantages are provided.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, the present inventors recognize that there are various challenges involved in supporting call center applications, including the challenges of authenticating agents and organizations with third parties, maintaining usability of third party sites, optimizing efficiency and effectivity of entering information in support of agent applications, and extending customer profile information across different applications. The invention aims at providing solutions for some or all of these challenges, among others.

More particularly, with respect to authenticating, employees of a call center (agents) may need to access a plurality of web sites in the course of servicing a customer. Each of these websites (e.g. associated with different insurance carriers) typically requires that a username/password pair be entered on the appropriate page. Moreover, each of these web sites is developed and managed by a separate entity from the call center which may have specific policies regarding the methods for access to the site.

Some carrier sites may insist on a separate username/password for each agent, while others insist on only one username/password per organization. The former case is not scalable and requires a high administrative cost. The latter case is not secure and is prone to Denial Of Service, since it is a best practice of security to lock an account after 3 to 5 unsuccessful login attempts. This Denial Of Service can be deliberate, as in the case of a disgruntled agent who locks all others out of the account by entering the correct username but a bogus password, or accidental, as in the case of a loyal and well-meaning agent who tries to login repeatedly with his CAPS LOCK on. The situation is not easily corrected; since in the time period shortly after the administrator obtains a new working password, hundreds of agents will continue to try to log in with the old (and now invalid) password, locking the account again. This behavior seems to occur despite any amount or type of communication that attempts to avoid it.

As stated above, the simple act of changing a password on an account can be nearly impossible. Another best practice of security is to change every password known by an agent upon their termination. It is often the nature of a large call center that agent terminations occur almost daily. If the carrier websites use the "one password per employee" model, this is merely a tedious administrative problem, but since many insist on the "one password per agency" paradigm, the problem seems insurmountable.

Finally, it may be desirable to allow access to information only when an agent is on the premises and supervised. With a simple carrier access username/password scheme, the agent could easily access the carrier sites from any location. These carrier sites may contain sensitive personal customer information which is to be safeguarded. The responsibility to keep this information secure is therefore left in the hands of each agent, which is sometimes not a desirable situation.

Despite security awareness training, background checks and other precautions, a large number of inexperienced agents are prone to a myriad of security attacks by which the authentication information (and/or the customer information) might be disclosed.

Next, more particularly with respect to usability, in an active call center, it is common for an agent to need to login to a large number of different carrier websites many times over the course of a workday. Each time, each agent must enter a username and password. It is not reasonable to expect each agent to remember every username/password for every site, so the access information must be recorded in some form. In addition to the poor security practice of doing this, the amount of time for hundreds or thousands of agents to perform this lookup tens of times per day may cause a significant impact to the business and the customer experience.

A single sign-on approach would also solve this issue, but such an approach would require the cooperation of multiple business partners, each of which have their own priorities and technologies.

More particularly with respect to efficiency, in many call center applications, customer information is collected and entered locally by an agent, then the same information must be entered into one or more other websites (after the login process). It is cumbersome and time-consuming to do this using a "cut and paste" method. It would be desirable for the information to be pre-filled into the remote websites' forms.

Relatedly, with respect to effectivity, many of the different sites accessed by agents as an important part of their job take very different approaches to collect the information necessary to accomplish the same ends. This can be very confusing, especially for the less-experienced agents. It diminishes the customer experience when the agent struggles to figure out the process while working with a customer on the phone.

Written tips could be provided in a separate document, but this method would be cumbersome to use. It would be desirable to provide tips to the agent automatically, as they view a page. For example, insurance agents, during their interaction via telephone with customers, could benefit from "scripting". Examples of things to say to the customer could be added to the page returned from a carrier site. This could improve workflow, eliminate omissions and ensure compliance.

Many other advantages could be gained by controlling agent web browsing. Monitoring of the agents browsing, including details of data entered, could be important in forensic security investigations. Taking this idea one step further, combinations of field names and data formats can be analyzed and action can be taken to prevent agents from entering certain types of data into certain fields. Examples include social security numbers, driver license numbers, and credit card numbers. Agents attempting to access obsolete or temporarily unavailable URLs could be redirected to other sites or local information messages. Agents accessing inappropriate URLs could be redirected to a local policy reminder page.

Finally, with respect to extensibility, information entered or viewed on a carrier site may have value as part of the agency customer data profile. For example, if a customer vehicle identification number is first discovered as part of the interview process while the agent is entering data in the carrier site, that value may be useful to be stored in the agency system for future use. Likewise, if a list of violations is first disclosed in the carrier site—perhaps making the person ineligible for the product—the agent would need to re-enter this data in the agency system to re-quote and identify another potential carrier.

Figure 1:
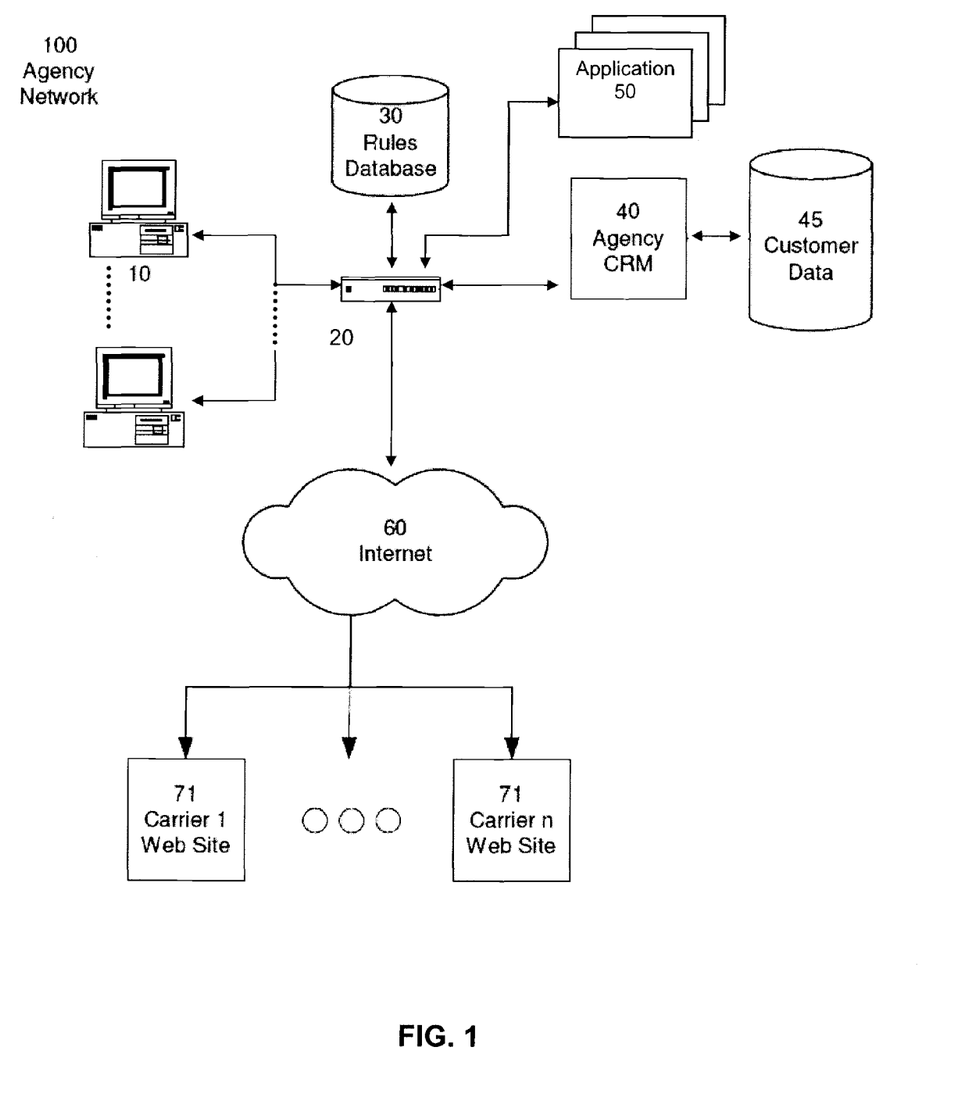
FIG. 1 is a block diagram illustrating an example implementation of certain aspects of the invention in a call center or company network.

An example implementation of certain aspects of the invention that addresses the above-identified challenges is shown in FIG. 1. As shown, within an agency network 100, system 20 lies in a communication path between each agent desktop 10 and carrier sites 71 via Internet 60 and/or other types of public and private computer, data and telephony networks, as well as between desktop 10 and agency applications 50. System 20 further communicates with agency customer relationship management (CRM) application 40 for access to customer and other data in database 45, either as a filter for access requested by desktop 10, or in support of interactions between desktop 10 and carrier sites 71 and/or applications 50. For all communications between each agent desktop 10 and other components within network 100 and components outside network 100 via Internet 60, rules stored in database 30 determines whether they should be passed along unchanged, blocked entirely, used to automatically generate a response, or the contents augmented or changed.

Agency network 100, or a call center, can consist of hundreds or thousands of insurance agents and customer service personnel, some or all having an agent desktop 10, and communicating with each other and with network components such as system 20 and agency CRM 40 via an internal network such as an Ethernet (not shown). These personnel can further communicate with a customer via telephone, fax, email or web interface, collecting data from the customer. Agent desktop 10 typically includes a web browser to access both internally developed applications 50 and applications provided by a plurality of insurance carriers and business partners (e.g. insurance carriers such as Safeco, Esurance, Travelers, Progressive, Unitrin, Electric, Hartford, Encompass, AIG and others, and third party data sources such as TransUnion for credit histories, Choicepoint and government agencies for driving records, etc.). These external websites are collectively represented by carrier sites 71. An agency has some degree of control over internally developed applications 50. They could be readily (though not necessarily easily) modified, extended, and customized to best serve the needs of the call center environment. On the other hand, an agency has no direct control over the functionality and operation of the carrier sites 71.

Agent desktops 10 can be implemented in many different ways, and it is not necessary that every agent desktop is the same. Moreover, the term "desktop" should not be considered limiting. For example, desktop 10 can be implemented by a browser application such as Internet Explorer running on a desktop, laptop, notebook computer such as a Windows or Mac computer. Many other types of computing devices and operating systems are possible. Desktop 10 preferably includes network communication functionality for interacting with sites 71, applications 50 and agency CRM 40 via a network such as a LAN, Ethernet and/or the Internet 60. Desktop 10 can further include browser plug-in functionality for communicating with system 20. Additional implementation details of desktop 10 will become apparent based on the functional and structural descriptions of the invention below.

System 20 can be implemented as one or more C#/.NET web services applications running on a Windows 2003 server within network 100, typically on the agency's side of a security firewall between the agency and the Internet 60 and as part of an Internet gateway, web proxy server or network router for network 100. Alternate embodiments could deliver this functionality together with desktop 10 as a browser plug-in, an application embedded in the computer's network stack, as a proxy application, or using any combination of these and other types of applications. Those skilled in the art will understand how to implement these alternatives after being taught by the foregoing and following examples.

In addition to functional aspects of controlling network communications according to the invention as will be described in more detail below, system 20 can include authentication functionality to verify that a requesting agent desktop 10 is running on the agency network 100. In one example, this requires that the person attempting access to network 100 or Internet 60 must have been authenticated as an agent with system 20. If system 20 cannot verify that a requesting agent desktop 10 is properly authenticated on the agency network 100 (e.g. if the desktop is lost or stolen or if the agent has been terminated), system 20 effectively disables desktop 10 by preventing any access to Internet 60 or any other components in network 100.

Agency CRM 40 can be any type of CRM application such as a system based on TAM and ConneXions from Applied Systems of University Park, IL. Customer database 45 can be databases managed by or interfacing with CRM 40 and/or can be other types of databases such as Microsoft SQL database and/or server. Applications 50 can be off-the-shelf or internally developed applications such as insurance quoting applications, lead generation systems, reporting and archiving systems, etc.

Although FIG. 1 and the following descriptions provide an illustrative and non-limiting embodiment in connection with an application of the invention in a call center for an insurance agency, those skilled in the art will be able to extend the principles of the invention to other systems and implementations, including or not including a call center. Moreover, for clarity in illustrating the invention, FIG. 1 omits many components that can also be included in a call center and/or company network 100, such as many other different types and brands of call center systems including PBX/phone switches, CTI systems, ACD systems, IVR systems, database applications, customer information databases and archiving systems, reporting and accounting servers, etc., as well as other types of network components such as routers, switches, gateways, load balancers, firewalls, and the like.

Still further, while certain components are shown in FIG. 1 communicating via a network, many variations in the number and selection of components and types of communications are possible. Moreover, while certain or all components may communicate via a network and/or using network protocols, not all such components in FIG. 1 need to be remotely located or grouped together/separated as shown. For example, one or more components can be included in a call center that is provided by one or more insurance carriers 71 or other agencies, and partially or fully located on the same premises as systems of such carrier(s) or agency(ies). It is also possible for some agent desktops 10 to be remotely located from agency network 100, and communicate with system 20 and network 100 via a VPN and/or other secure remote access mechanisms, for example. Those skilled in the art will understand various other alternative implementations, groupings and associations.

Figure 2:
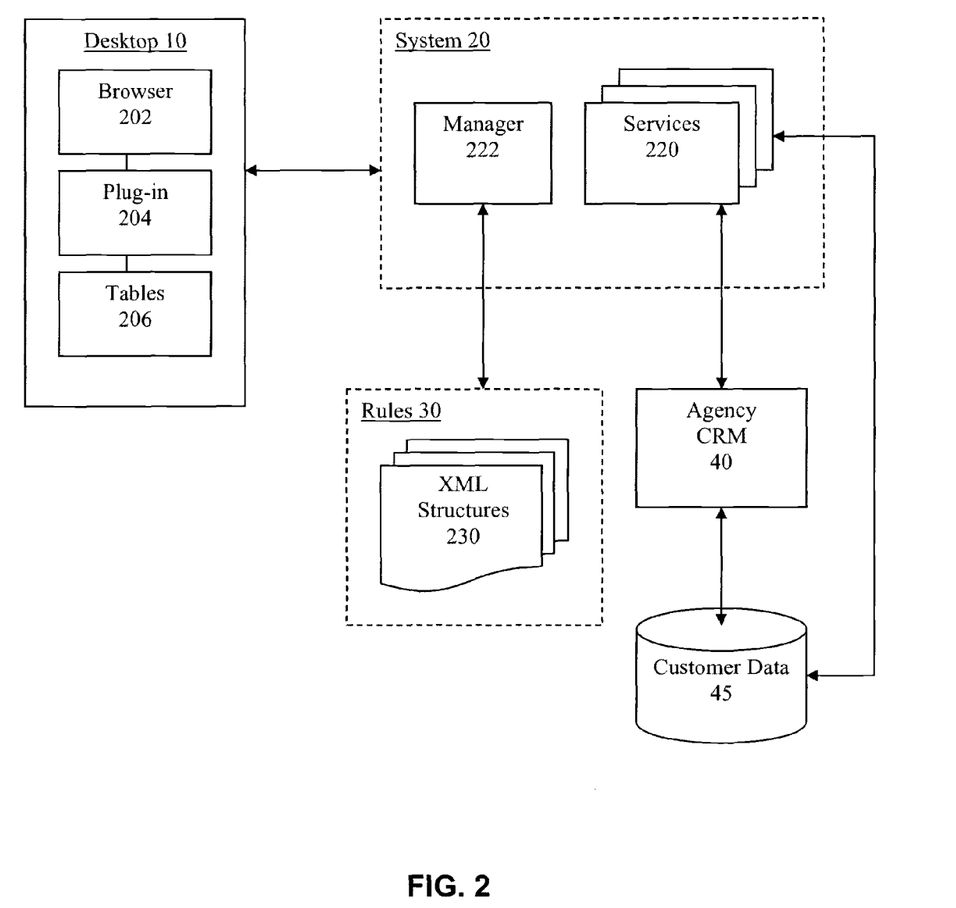
FIG. 2 is a block diagram illustrating certain components of the invention in alternative detail.

Certain example implementation details of the invention are further illustrated in FIG. 2. As shown in FIG. 2, desktop 10 in this example embodiment includes a browser 202, browser plug-in application 204, and tables 206. As further shown, system 20 is substantially implemented as a manager process 222 and one or more services 220 and rules database 30 is substantially implemented as XML structures 230.

Browser 202 is, for example, Internet Explorer and plug-in application 204 is customized code that is run whenever browser 202 is running on desktop 10, as is well understood by those skilled in the art. The implementation details of plug-in application 204 will become more apparent in view of the detailed functional descriptions that will be provided more fully below.

In this example, whenever an agent wants to access the Internet for communicating with carrier sites 71 or applications 50, browser 202 is launched. Plug-in application 204 is, for example, implemented as a Browser Helper Object, so it is automatically initiated when browser 202 is launched. Plug-in application 204 retrieves a local copy of rules 30, for example from a hard drive or other permanent storage, and places the information in tables 206, which preferably resides in system memory of desktop 10. Alternatively, plug-in application 204 can automatically communicate with manager process 222, and process 222 can retrieve an appropriate XML structure 230 from database 30 and send it to plug-in application 204, which stores a local copy into tables 206. Plug-in application 204 can also periodically check with system 20 for any applicable updates to tables 206. When launched, plug-in application 204 can also automatically prompt the agent to enter credentials such as a username/password combination. If authentication is successful, plug-in application 204 can also retrieve and, if necessary decrypt (e.g. using a PKI mechanism in communication with system 20), the local copy of rules 30 before storing them in tables 206. Those skilled in the art will understand how to implement such encryption and decryption mechanisms and other alternatives. It should be noted that tables 206 can store additional information that is needed for plug-in application 204 during operation, as will become more apparent below.

In embodiments, there may be several different XML structures (for example, for different types, identities and levels of employees), and system 20 (e.g. manager process 222) can select the appropriate one to use for a particular agent and/or desktop 10, for example after authenticating the user who is using desktop 10 with login credentials using local network authentication means well known in the art. This authentication can be in addition or alternatively to the user entering matching credentials already locally stored in tables 206 when the user first launches the browser 202 application, for example. For example, system 20 could use the information stored in Windows Active Directory to determine whether an authenticated user's Active Directory security group membership would cause different administrator, call center director, sales manager, or agent rulesets to be selected for the user. Moreover, it should be noted that system 20 (e.g. manager process 222) can include functionality for letting an administrator or the like view and change settings in rules 30.

An example rule 230 structure is shown in TABLE 1 below.

TABLE 1

```
<RuleSet Name = "Rule Set 1">
  ....
  <Rules>
    <Rule Name = "Rule 1">
      <URLPattern Pattern = "/lasdfllkj/asdlkjfslakdj">
```

TABLE 1-continued

```
      <Fields>
        <FieldList Name = "Field 1" FieldName = "[field name]">
        ....
      </Fields>
      <ActionTaken Action = "Reject">
      <PriorityLevel Priority = "Normal">
      <CalloutFunction Handle = "[service handle]">
      <MessageText Message = "You are not authorized to view
        this content">
    </Rule>
    <Rule Name ="Rule 2">
      ....
    </Rule>
    ...
    <Rule Name ="Rule N">
      ...
    </Rule>
  </Rules>
</RuleSet>
```

As shown in this example, each rule in the structure contains multiple fields. The first field, the URL pattern, can include one or more wildcards (e.g. *.uspto.gov* for any URLs having .uspto.gov anywhere in the entire URL). Moreover, it is possible for a given URL, or any portion thereof, to match multiple rules. In that case all actions associated with the rules are executed in an order determined by the priority field described below. The action field preferably identifies one of the actions to be taken, as described in more detail below, if the URL pattern field matches the current URL or any portion thereof.

The field list field contains the names of the fields of interest for the given URL pattern, such as an HTML field name within a FORM element, or an HTML4 "id" attribute. For example, if the action to be taken is to pre-fill values in a "customer_address" field of a web page, this list will contain the name of that field. The priority field preferably contains a unique priority value. Actions are preferably executed in order from highest to lowest. It is possible that multiple actions will be executed on any given request, if the URL pattern matches more than one rule. The callout function provides a handle (such as a URL) to one of the web services 220 used to complete the action. The message text field provides text or a pointer to text to be used in any error message, warning, etc.

Figure 3:
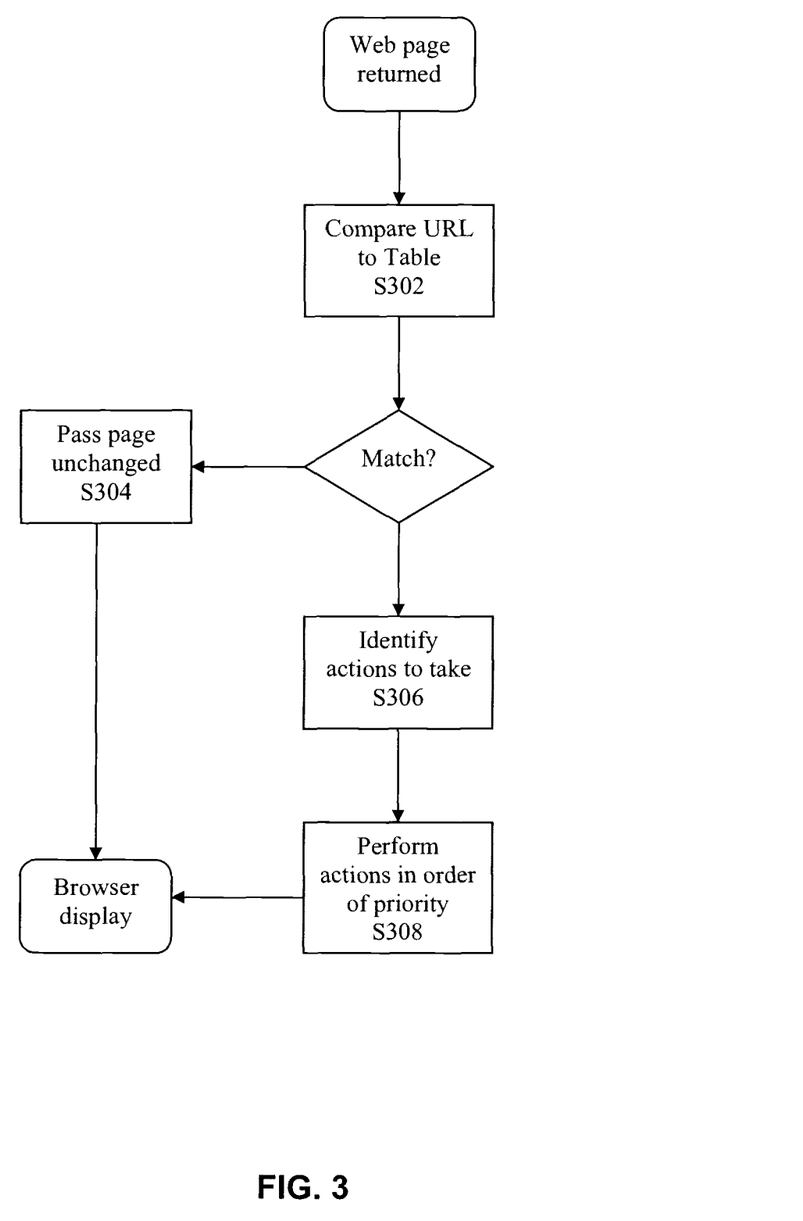
FIG. 3 is a flowchart illustrating certain aspects of the invention in connection with web pages returned to an agent desktop.

An example operation of plug-in application 204 and system 20 whenever a web page is returned to desktop 10, for example from a carrier site 71 or one of applications 50, will be described in connection with FIG. 3. In a first step S302, when browser 202 is ready to display a new page, plug-in application 204 is invoked by the browser 202 and compares the URL of the page to the URL patterns stored in tables 206. In step S304, if no matching URL patterns are found, it does nothing and plug-in 204 passes the page along to browser 202 to display unchanged. Otherwise in step S306, if it finds one or more actions, it processes them in order of priority. This can include calling one or more of services 220. Thereafter, the browser displays the web page and/or other content as determined by the actions.

Figure 4:
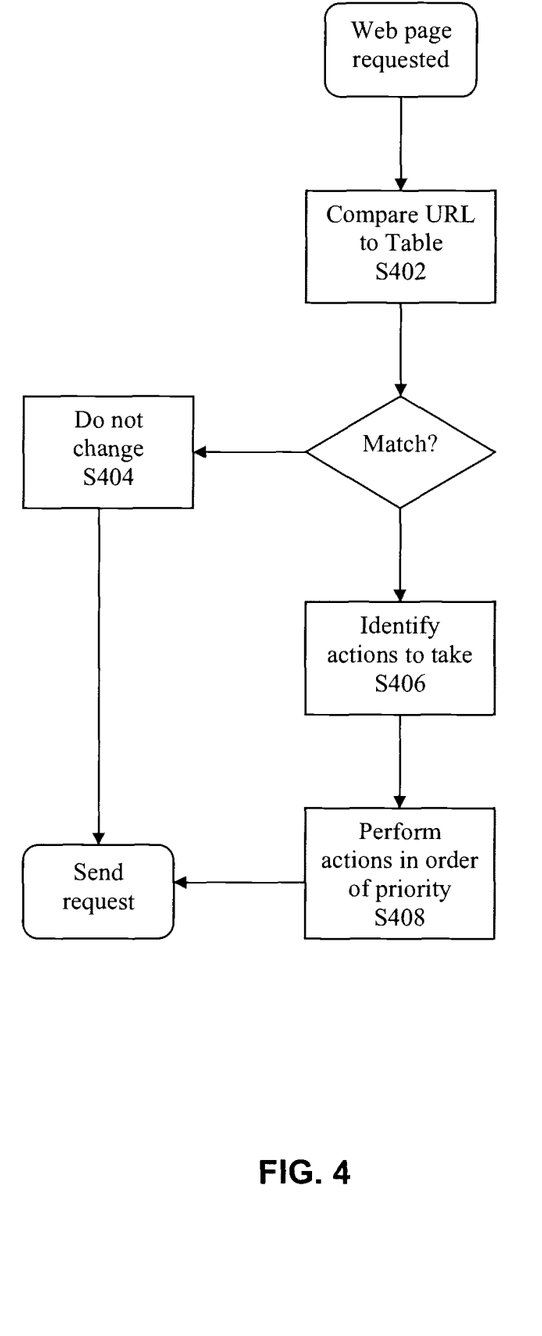
FIG. 4 is a flowchart illustrating certain aspects of the invention in connection with web pages requested by an agent desktop.

An example operation of plug-in application 204 and system 20 whenever the browser 202 in desktop 10 requests a URL will be described in connection with FIG. 4. As shown, in a first step S402, when a URL is entered in the browser (e.g. user typing URL in a search field, clicking on a link or control in a web page, etc.), plug-in 204 is invoked by the browser 202 and determines whether the URL matches any patterns in table 206. If no matching URL patterns are found, the request is passed along unchanged in step S406. Otherwise it determines the actions to take in step S406 from the table 206 entry, and executes the actions in order of priority in step S408. This can include calling one or more of services 220. Thereafter, the browser sends the request and/or other content as determined by the actions.

Returning to FIG. 2, services 220 correspond to certain of the actions supported in one example implementation of the invention. For example, a "customer_address" could be sent to the URL of a Web Service (specified as the CalloutFunction Handle) that would return a message indicating whether the customer address was within an area for which any moratoriums were currently imposed. Some non-limiting examples of the types of services will be described below.

For pages that are returned to desktop 10, for example from carrier sites 71 or applications 50, plug-in application 204 can call a service 220 that automatically retrieves information from customer database 45, either directly or through agency CRM application 40, that is relevant to that page. For example, rules 30 can be configured with the URL for a carrier insurance policy application page. When this page is returned to desktop 10, for example when an agent is completing an application for a customer whose ID was provided by a CTI application, plug-in application 204 can call a service 220 with the customer's ID to retrieve the customer's information from database 45. Service 220 can return the retrieved information to plug-in application 204, which can then fill in name, address and perhaps other fields of the page before/while it is displayed by browser 202.

Rather than causing the returned page to just be displayed with filled-in fields, other actions can be taken by plug-in application 204 with or without calling a service 220. For example, if the page is a login page for a carrier site 71, plug-in 204 can automatically fill in fields, such as a username/password pair retrieved from tables 206, and automatically cause browser 202 to resubmit the page to the carrier site 71. It should be apparent that this feature can solve the Denial Of Service and system lockout problems described above, since it can prevent an employee/agent from accidentally or purposely entering wrong authentication credentials. Also, since the credentials are automatically filled in by the application 204, they can be hidden from the employee/agent, thus enhancing overall security. It should be further apparent that, by simply configuring the contents of tables 206, the system can support individual (one username/password per agent) and shared (one username/password per organization) account models, all transparent to the employee/agent.

Moreover, rather than filling in fields, plug-in 204 can extract information from fields in a page. For example, plug-in 204 can parse fields in a page returned by carrier site 71 and call a service 220 to store the extracted information in agency CRM 40 and/or customer data profile 45 (e.g., screen scraping and capture of returned carrier site data). Plug-in 204 can also insert its own text or controls into a returned page. For example, plug-in 204 can insert Javascript code that will cause an error message to appear under specific situations such as timeout or page unload. As another example, when specific data patterns (such as those matching Social Security Numbers) appear in the page to be returned to the agent, plug-in 204 could inject additional HTML content that reminds the agent of their responsibility to keep sensitive customer data secure, either via a pop-up window or within the markup of the returned page. As a still further example, the special content can include helpful instructions, as might be done to assist an agent in filling form fields (e.g. for training), or to provide suggestions for scripting employee/agent interactions with customers.

For page or other requests from desktop 10, plug-in 204 can, if the URL matches a pattern in tables 206, reject the request entirely and respond with a (possibly empty) error message page. For example, employers can list in rules 30 all the websites that do not conform with company policy for employee access during business hours. Rather than rejecting the application entirely, plug-in 204 can verify access rights and then possibly issue a warning and prompt to confirm continued action. For example, rules 30 and tables 206 can include quotas for how much time employees are allowed to spend per day on personal web sites such as sports sites. Each time an employee requests access to such a site, plug-in 204 can deduct the time spent on that site and store the result in tables 206, and/or display a message via browser 202 indicating the time left. Thereafter, if the quota is exceeded, further access can be prevented. In addition to time quotas, there can be other types of quotas, such as for how many accesses are allowed for a given category of requests. Then if the quota is exceeded, plug-in 204 will not allow the request to be forwarded, and instead will cause an error message to be displayed (e.g., limit the number of special insurance report requests to 10 per day).

Similarly to pages returned to desktop 10, for pages returned or requested by desktop 10, plug-in application 204 can parse fields for information entered by an agent on a page, call services 220 to store the extracted data in agency CRM 40 and/or customer data profile 45, and then pass the request on to the carrier site (e.g., log entry of sensitive data). Moreover, rather than just forwarding the request, plug-in application 204 can parse fields and reject the request (e.g., prohibit the entry of certain types of data such as credit card numbers or social security numbers).

Those skilled in the art will understand how to extend the actions to support additional functions after being taught by the above examples.

It should be noted that system 20 and/or manager process 222 can further include a service that retains information on each agent browser session. This can include the agent identification (used in building the username and password for those carrier sites with unique agent logins) and customer identification (used for pre-filling and bridging, and for extending the customer data profile). Those skilled in the art could identify many implementations of this association.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
    detecting every web page that is requested by or returned to a browser application on a computing device;
    comparing a URL associated with each web page to a plurality of URL patterns in a table;
    if there is a match:
    retrieving an action associated with a matching one of the URL patterns from the table; and
    automatically performing the action using functionality on the computing device that is separate from the browser application, and does not require any action by a user other than requesting or receiving the web page using the browser application,
    wherein the table of URL patterns is stored on the computing device, and wherein the table further stores a field associated with one or more of the URL patterns, the field comprising a field in a form associated with the web page, the action associated with the one or more URL patterns being automatically filling information in the field associated with the web page.

2. A method according to claim 1, wherein the action includes entering login credentials to a remote site while hiding the credentials from the user.

3. A method according to claim 2, wherein the login credentials are unique to the user.

4. A method according to claim 2, wherein the login credentials are common among a plurality of users in an organization.

5. A method according to claim 1, further comprising:
authenticating the user who is using the computing device via the table when the user launches the browser application.

6. A method according to claim 1, further comprising:
downloading the table to the computing device from an external rules database.

7. A method according to claim 6, further comprising:
obtaining identification information associated with the user;
selecting the table from among a plurality of different tables in the external rules database based on the obtained identification information.

8. A method according to claim 7, further comprising:
allowing an administrator to change contents of the tables stored in the external rules database.

9. A method according to claim 1, wherein the action includes blocking display of the requested or returned web page.

10. A method according to claim 1, wherein the action includes filling in contents of one or more fields in the web page.

11. A method according to claim 1, wherein the action includes extracting contents from one or more fields in the web page.

12. A method according to claim 1, wherein the action includes displaying additional content in the browser application that is not part of the web page, along with contents of the web page.

13. A method according to claim 12, wherein the additional content includes instructions for the user associated with one or more fields in the web page.

14. A method according to claim 1, wherein the action includes modifying content in the web page before it is displayed by the browser application.

15. A method according to claim 1, further comprising:
maintaining a record of the user's web browsing activities.

16. A method according to claim 1, further comprising:
maintaining a record of data entered by the user in one or more fields of the web page.

17. A method according to claim 1, wherein the action includes restricting web browsing of predetermined web sites according to predetermined limits.

18. A method according to claim 1, wherein the action includes restricting the user's data entry of predetermined items of information into one or more fields in the web page.

19. A system comprising:
a plurality of computing devices, each having a browser application;
a rules database that stores rules containing certain predetermined actions to perform based on certain URL patterns, and further stores information to be used when performing the actions; and
a mechanism that is separate from, and automatically detects every web page requested by or returned to, the browser application in the plurality of computing devices, and automatically performs the predetermined actions if there is a match,
wherein copies of certain portions of the rules database are stored in a table of URL patterns on the computing device, and wherein the table further stores a field associated with one or more of the URL patterns, the field comprising a field in a form associated with the web page, the predetermined action associated with the one or more URL patterns being automatically filling information in the field associated with the web page.

20. A system according to claim 19, wherein the actions includes entering login credentials to a remote site while hiding the credentials from the user, and wherein the stored information in the rules database includes the login credentials.

21. A system according to claim 19, wherein the mechanism includes a plug-in application for the browser application.

22. A system according to claim 21, further comprising a locally stored copy of a portion of the rules database.

* * * * *